(12) United States Patent
Saunders et al.

(10) Patent No.: US 7,818,991 B2
(45) Date of Patent: Oct. 26, 2010

(54) GUIDE SYSTEM RELEASE DEVICE FOR VEHICLE IMPACT TESTING

(75) Inventors: Todd L. Saunders, Jackson, MI (US); Maynard L. Robinson, Howell, MI (US); David L. Tiihonen, Howell, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 728 days.

(21) Appl. No.: 11/828,882

(22) Filed: Jul. 26, 2007

(65) Prior Publication Data

US 2009/0026341 A1    Jan. 29, 2009

(51) Int. Cl.
*G01N 3/00* (2006.01)
*G01N 3/02* (2006.01)
*G01M 19/00* (2006.01)

(52) U.S. Cl. ............... 73/12.04; 73/856; 73/865.3; 73/12.01; 73/12.11

(58) Field of Classification Search ............... 73/11.04, 73/11.07, 12.01, 12.04–12.05, 12.07, 856, 73/865.3; 248/409
See application file for complete search history.

(56) References Cited

U.S. PATENT DOCUMENTS

| 5,635,624 | A * | 6/1997 | Cerny ............... 73/12.04 |
| 7,543,475 | B2 * | 6/2009 | Rieser et al. ......... 73/12.04 |
| 2004/0168503 | A1 * | 9/2004 | Kojima et al. ......... 73/12.01 |

FOREIGN PATENT DOCUMENTS

JP        11118660 A  *  4/1999

* cited by examiner

*Primary Examiner*—Lisa M Caputo
*Assistant Examiner*—Jonathan Dunlap
(74) *Attorney, Agent, or Firm*—Ralph E. Smith

(57) ABSTRACT

A guide release system for use in an impact test of a motor vehicle includes a first guide releasably coupled to a first portion of the motor vehicle to guide the first portion of the motor vehicle towards a test barrier. The system also includes a second guide releasably coupled to a second portion of the motor vehicle to guide the second portion of the motor vehicle towards the test barrier. The second guide is displaced a distance from the first guide. The system further includes an actuator that releases the first guide and the second guide substantially simultaneously to enable the motor vehicle to freely contact the test barrier.

20 Claims, 3 Drawing Sheets

GUIDE SYSTEM RELEASE DEVICE FOR VEHICLE IMPACT TESTING

FIELD

The present disclosure relates to vehicle impact test systems, and more particularly to a guide system release device for motor vehicle impact testing.

BACKGROUND

The statements in this section merely provide background information related to the present disclosure and may not constitute prior art.

Most motor vehicles have to comply with certain safety regulations, such as those outlined by the Insurance Institute for Highway Safety (IIHS) and the National Highway Traffic Safety Administration (NHTSA). These safety regulations can detail crash test or impact worthiness guidelines for various areas of the motor vehicle. An exemplary guideline may require the motor vehicle to endure a side impact collision without injuring the occupants of the motor vehicle. The regulation may also require that the motor vehicle be freewheeling during the side impact collision.

SUMMARY

A guide release system for use in an impact test of a motor vehicle is provided. The system includes a first guide releasably coupled to a first portion of the motor vehicle to guide the first portion of the motor vehicle towards a test barrier. The system also includes a second guide releasably coupled to a second portion of the motor vehicle to guide the second portion of the motor vehicle towards the test barrier. The second guide is displaced a distance from the first guide. The system further includes an actuator that releases the first guide and the second guide substantially simultaneously to enable the motor vehicle to freely contact the test barrier.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. Although the following description is related generally to a guide system release device for motor vehicle impact testing, it will be understood that the guide system release device as described and claimed herein is applicable to any type of impact testing in which it is desirable to release one or more portions of the test article at the same time. Therefore, it will be understood that the following discussion is not intended to limit the scope of the appended claims to only side impact or motor vehicle applications.

Figure 1:
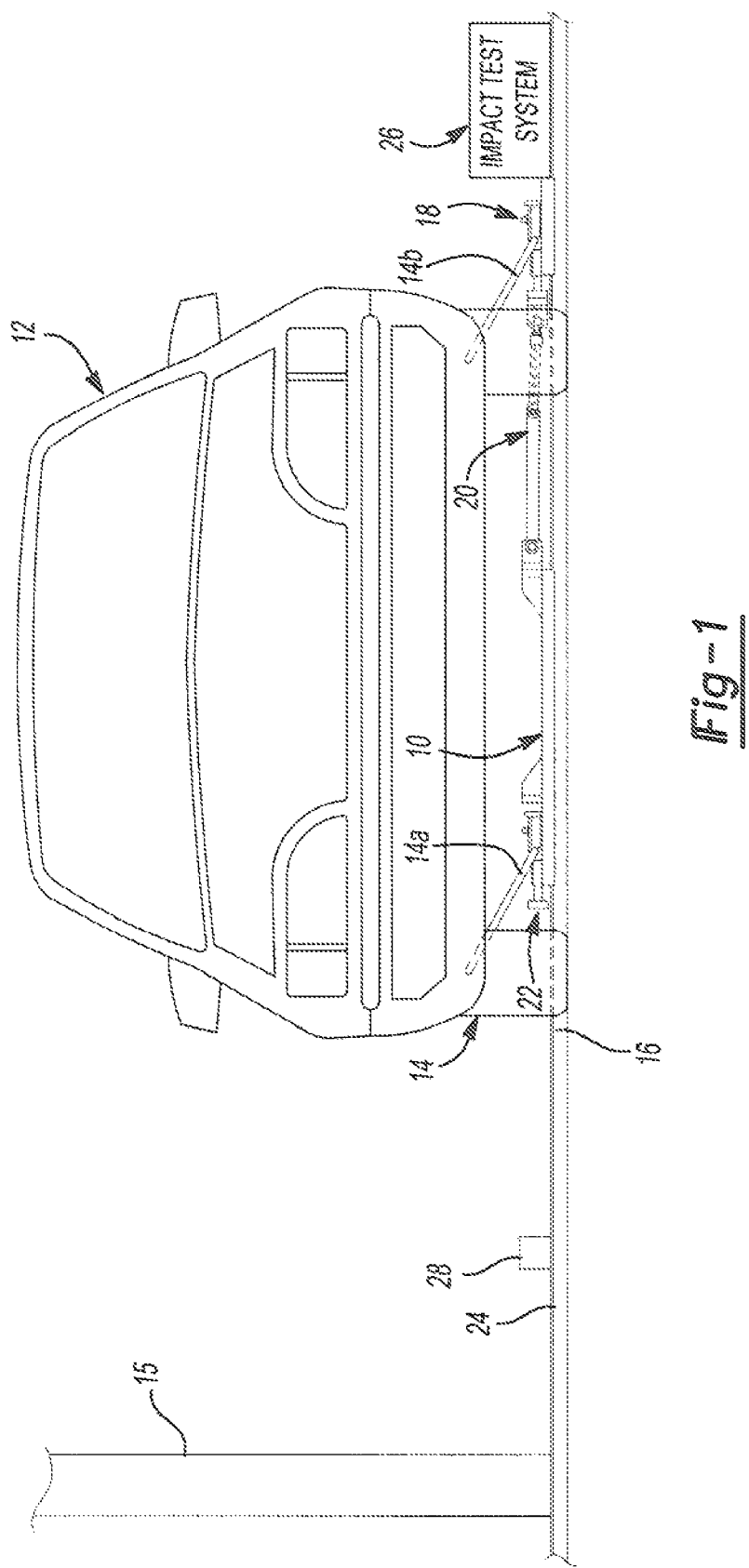
FIG. 1 is a schematic environmental illustration of a guide system release device for use in vehicle impact testing according to the principles of the present disclosure.

With reference to FIG. 1, an exemplary guide system release device 10 for motor vehicle impact testing is shown. The guide system release device 10 may be coupled to a motor vehicle 12 to facilitate the side impact testing of the motor vehicle 12. The guide system release device 10 may be coupled to the motor vehicle 12 by one or more swing arms 14, for example, such as a first swing arm 14a and a second swing arm 14b. The guide system release device 10 releases the swing arms 14 simultaneously to enable the motor vehicle 12 to freely contact or free-wheel into a side impact test barrier 15 (i.e. the motor vehicle 12 is not guided into the side impact test barrier 15). The guide system release device 10 includes a first guide 16, a second guide 18, a rod 20 and an actuator 22. As illustrated in FIG. 1, the first guide 16 and the second guide 18 are each slideably coupled to a rail 24 such that the first guide 16 and the second guide 18 may be driven by an impact test system 26 into the test barrier 15. The impact test system 26 also includes a stop 28 that contacts the actuator 22 to enable the substantially simultaneous release of the first swing arm 14a and the second swing arm 14b from the first guide 16 and the second guide 18, as will be discussed.

Figure 2:
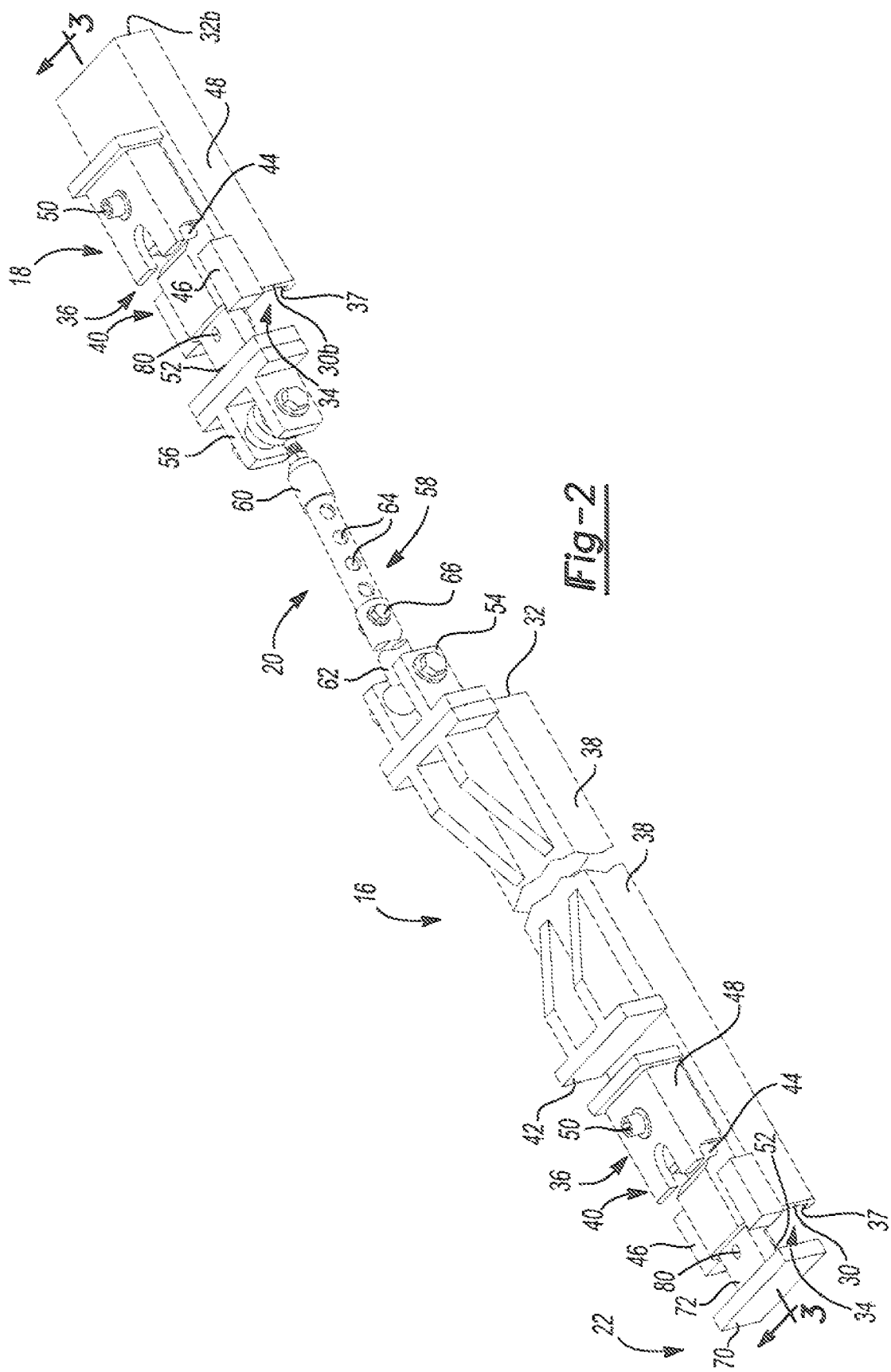
FIG. 2 is a detail perspective view of the guide system release device of FIG. 1.

With reference to FIG. 2, the first guide 16 and the second guide 18 are shown in greater detail. The first guide 16 is releasably coupled to the first swing arm 14a. The first guide 16 includes a first end 30, a second end 32 and a rail guide 34 opposite a release system 36. The first end 30 of the first guide 16 is coupled to the actuator 22, while the second end 32 is coupled to the rod 20. The first guide 16 may also include an extended body 38 that couples the first end 30 to the second end 32. The rail guide 34 may be disposed opposite the release system 36, and defines a slot 37 that mates with the rail 24. The slot 37 of the rail guide 34 interfaces with the rail 24 so that the first guide 16 may be driven by the impact test system 26. The release system 36 is disposed at the first end 30.

Figure 3:
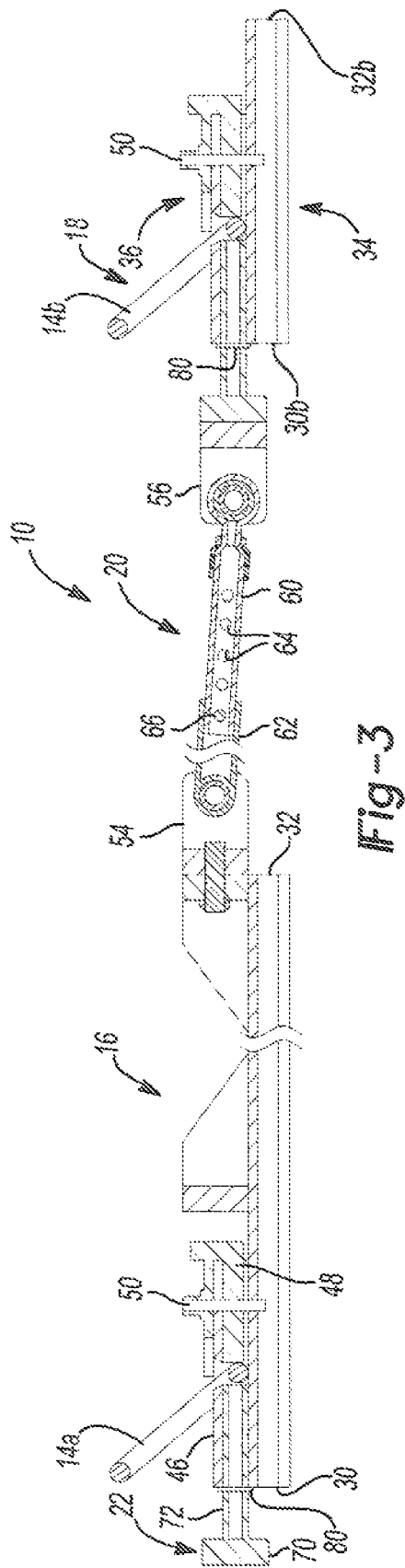
FIG. 3 is a cross-sectional view of the guide system release device of FIG. 2, taken along line 3-3 of FIG. 2, illustrating the guide system release device in a first position.
Figure 4:
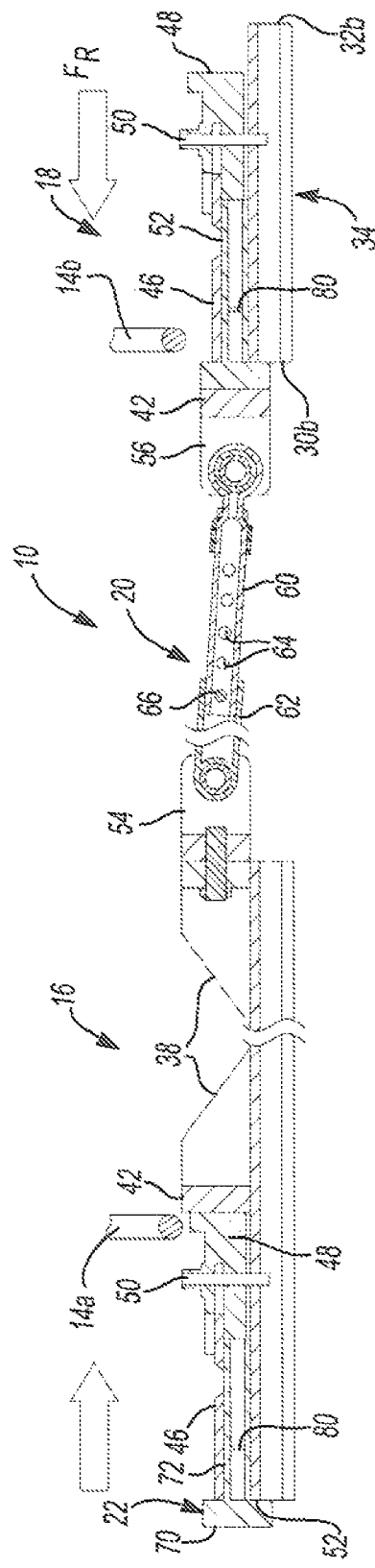
FIG. 4 is a detail perspective view of the guide system release device of FIG. 2, taken along line 3-3 of FIG. 2, illustrating the guide system release device in a second position.

The release system 36 includes a slideable member 40 and a fixed member 42. The slideable member 40 is spaced apart from the fixed member 42 in a first position to define an opening 44 for receipt of the first swing arm 14a, as shown in FIG. 3. In a second position, a portion of the slideable member 40 is operable to extend to close the opening 44 and thereby force the first swing arm 14a out of the first guide 16, as shown in FIG. 4. The slideable member 40 includes a housing 46, an extension 48 and a pin 50. The housing 46 is fixed to the first end 30 and defines a slot 52. The extension 48 is slideably coupled to the slot 52, and is operable in the first position to define the opening 44, and is operable in the second position to extend out and close the opening 44. The extension 48 is retained by the pin 50. The pin 50 shears in response to the activation of the actuator 22 to enable the extension 48 to slide and contact the first swing arm 14a to force the first swing arm 14a from the release system 36. The pin 50 may be composed of a material that enables the pin 50 to shear upon receipt of an input from the actuator 22, and may be comprised of a metal, metal alloy or polymeric material.

The second guide 18 is coupled to the first guide 16 by the rod 20. As the first guide 16 and the second guide 18 are similar, the same reference numerals will be used to identify the same or similar components. The second guide 18 is releasably coupled to the second swing arm 14b. The second guide 18 includes a first end 30b, a second end 32b and the rail guide 34 opposite the release system 36. The first end 30b of the second guide 18 is coupled to the rod 20, while the second end 32b is coupled to the actuator 22. As the rail guide 34 of the second guide 18 is substantially similar to the rail guide 34 of the first guide 16, the rail guide 34 of the second guide 18 will not be discussed in great detail herein. Briefly, however, the rail guide 34 of the second guide 18 interfaces with the rail 24 so that the second guide 18 may be driven by the impact test system 26.

The release system 36 of the second guide 18 is a mirror image of the release system 36 of the first guide 16, and thus, the release system 36 of the second guide 18 will not be discussed in great detail herein. Briefly, however, the slideable member 40 is spaced apart from the fixed member 42 in a first position to define the opening 44 for receipt of the second swing arm 14b. in a second position, a portion of the slideable member 40 is operable to extend to close the opening 44 and thereby force the second swing arm 14b out of the second guide 18. As discussed with regard to the first guide 16, the pin 50 of the release system 36 of the second guide 18 shears in response to the activation of the actuator 22 to enable the extension 48 to slide out of the slot 52 to force the second swing arm 14b from the release system 36.

The rod 20 couples the first guide 16 to the second guide 18. The rod 20 includes a first end 54, a second end 56 and an extendable body 58. The first end 54 of the rod 20 is coupled to the second end 32 of the first guide 16, while the second end 56 of the rod 20 is coupled to the first end 30 of the second guide 18. The extendable body 58 adjusts a distance that exists between the first guide 16 and the second guide 18 to enable the guide system release device 10 to be used with motor vehicles of varying widths. The extendable body 58 includes a first member 60 and a second member 62. The first member 60 defines one or more bores 64, while the second member 62 defines a bore 66, with each of the bores 64, 66 adapted for receipt of a mechanical fastener, such as a bolt, screw, pin, rivet, etc. The first member 60 is slideably received within the second member 62 such that a selected bore 64 of the first member 60 may be aligned with the bore 66 of the second member 62 to couple the first member 60 to the second member 62 at a desired position via the mechanical fastener. Thus, in order to adjust the first guide 16 relative to or with respect to the second guide 18, with the mechanical fastener removed from the bores 64, 66, the first member 60 is slid until a selected bore 64 of the first member 60 is aligned with the bore 66 of the second member 62, and then the mechanical fastener is inserted through the bores 64, 66 to secure the first member 60 to the second member 62. The rod 20 forms a rigid connection between the first guide 16 and the second guide 18 to enable transfer of a force generated by the actuator 22 between the first guide 16 and the second guide 18.

The actuator 22 is coupled to the first end 30 of the first guide 16. The actuator 22 includes a contact surface 70 coupled to a body 72. The body 72 of the actuator 22 is slideably received within slot 52 of the housing 46 of the first guide 16. The body 72 of the actuator 22 extends from the housing 46 of the first guide 16 so that the contact surface 70 may contact the stop 28. Upon contacting the stop 28, the contact surface 70 is pushed, compressed or forced against the housing 46 of the first guide 16, and the body 72 slides within the slot 52 to enable the simultaneous release of the first swing arm 14a and the second swing arm 14b.

To perform an impact test with the guide system release device 10, the guide system release device 10 is coupled to the first swing arm 14a and the second swing arm 14b via the opening 44, and the rail guide 34 of the first guide 16 and the second guide 18 is coupled to the rail 24. Then, the impact test system 26 drives the first guide 16 and the second guide 18 towards the test barrier and the stop 28. With the actuator 22 extended from the housing 46 of the first guide 16, the contact surface 70 contacts the stop 28. Once the contact surface 70 contacts the stop 28, the body 72 of the actuator 22 is forced into the slot 52 of the housing 46 of the first guide 16, and the body 72 contacts the extension 48. The contact between the body 72 and the extension 48 shears the pin 50 and releases the extension 48, causing the extension 48 to slide into the opening 44. When the extension 48 slides into the opening 44, it forces the first swing arm 14a from the opening 44, thereby releasing the first swing arm 14a from the first guide 16.

Substantially simultaneously, the impact of the actuator 22 contacting the stop 28 shears the pin 50 of the second guide 18. In this regard, the momentum of the second guide 18 in the rail 24 creates a force $F_R$ that shears the pin 50 upon the impact between the actuator 22 and the stop 28. The force $F_R$ is a reaction force created from the impact between the actuator 22 and the stop 28 as this impact halts the forward movement of the second guide 18. When the pin 50 of the second guide 18 is sheared, the extension 48 extends into the opening 44 to release the second swing arm 14b from the second guide 18.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A guide release system for use in an impact test of a motor vehicle comprising:
    a first guide releasably coupled to a first portion of the motor vehicle to guide the first portion of the motor vehicle towards a test barrier;
    a second guide releasably coupled to a second portion of the motor vehicle to guide the second portion of the motor vehicle towards the test barrier, the second guide displaced a distance from the first guide; and
    an actuator that releases the first guide and the second guide substantially simultaneously to enable the motor vehicle to freely contact the test barrier.

2. The system of claim 1, further comprising a first swing arm coupled to the first portion of the motor vehicle and a second swing arm coupled to the second portion of the motor vehicle, the first swing arm releasably coupled to the first guide and the second swing arm releasably coupled to the second guide.

3. The system of claim 2, wherein the first guide and the second guide are configured to be driven by an impact system to drive the first portion and the second portion of the motor vehicle toward the test barrier.

4. The system of claim 3, wherein the impact system includes a track and a stop, with the first guide and second guide each received in the track, and the actuator contacting the stop to release the first swing arm from the first guide and the second swing arm from the second guide.

5. The system of claim 4, wherein the actuator includes a compressible member slideably coupled to the first guide that contacts the stop, which compresses the compressible member to release the first swing arm and second swing arm.

6. The system of claim 5, further comprising a rod that couples the first guide to the second guide, the rod adjustable to enable the first guide to move relative to the second guide, and the rod enables a transfer of force from the contact between the compressible member and the stop from the first guide to the second guide to enable the substantially simultaneous release of the first swing arm and the second swing arm from the first guide and the second guide.

7. The system of claim 6, wherein the first guide and the second guide each include a slideable member fixed from movement by a shear pin, and when fixed, each slideable member couples the respective first guide and second guide to the first swing arm and second swing arm, and when released by the shear pin, each slideable member forces the respective first swing arm and second swing arm out of engagement with the respective first guide and the second guide.

8. The system of claim 7, wherein the contact between the compressible member and the stop shears the shear pin in both the first guide and the second guide to release the slideable member so that each slideable member releases the first swing arm and second swing arm substantially simultaneously.

9. A guide release system for use in an impact test of a motor vehicle comprising:
 a first guide releasably coupled to a first portion of the motor vehicle to guide the first portion of the motor vehicle towards a test barrier;
 a second guide releasably coupled to a second portion of the motor vehicle to guide the second portion of the motor vehicle towards the test barrier;
 a rod that couples the first guide to the second guide, the rod adjustable to enable the first guide to move relative to the second guide; and
 an actuator that is adapted to contact a stop to release the first guide and the second guide substantially simultaneously to enable the motor vehicle to freely contact the test barrier.

10. The system of claim 9, further comprising a first swing arm coupled to the first portion of the motor vehicle and a second swing arm coupled to the second portion of the motor vehicle, the first swing arm releasably coupled to the first guide and the second swing arm releasably coupled to the second guide.

11. The system of claim 10, wherein the first guide and the second guide are configured to be driven by an impact system to drive the first portion and the second portion of the motor vehicle toward the test barrier, and the impact system includes a track that receives the first guide and second guide to drive the first guide and second guide towards the test barrier.

12. The system of claim 11, wherein the impact system further comprises a stop, and the actuator further comprises a compressible member slideably coupled to the first guide that contacts the stop to release the first guide and the second guide through the compression of the compressible member.

13. The system of claim 12, wherein the rod enables a transfer of force from the contact between the compressible member and the stop from the first guide to the second guide to enable the substantially simultaneous release of the first swing arm and the second swing arm from the first guide and the second guide.

14. The system of claim 13, wherein the first guide and the second guide each include a slideable member fixed from movement by a shear pin, and when fixed, each slideable member couples the respective first guide and second guide to the first swing arm and second swing arm, and when released by the shear pin, each slideable member forces the respective first swing arm and second swing arm out of engagement with the respective first guide and the second guide.

15. The system of claim 14, wherein the contact between the compressible member and the stop shears the shear pin in both the first guide and the second guide to release the slideable member so that each slideable member releases the first swing arm and second swing arm substantially simultaneously.

16. A guide release system for use in an impact test of a motor vehicle comprising:
 a motor vehicle having a front end and a rear end, a first swing arm coupled to the front end and a second swing arm attached to the rear end;
 a first guide releasably coupled to the first swing arm to guide the front end of the motor vehicle towards a test barrier;
 a second guide releasably coupled to the second swing arm to guide the rear end of the motor vehicle towards the test barrier;
 a rod that couples the first guide to the second guide, the rod adjustable to enable the first guide to move relative to the second guide; and
 an actuator that releases the first guide and the second guide substantially simultaneously to enable the motor vehicle to freely contact the test barrier.

17. The system of claim 16, wherein the first guide and the second guide are configured to be driven by an impact system to drive the first portion and the second portion of the motor vehicle towards the test barrier, and the impact system includes a track that receives the first guide and second guide to drive the first guide and second guide towards the test barrier.

18. The system of claim 17, wherein the impact system further comprises a stop, and the actuator further comprises a compressible member slideably coupled to the first guide that contacts the stop to release the first swing arm, with the rod operable to enable a transfer of force from the contact between the compressible member and the stop from the first guide to the second guide to enable the substantially simultaneous release of the first swing arm and the second swing arm from the first guide and the second guide.

19. The system of claim 18, wherein the first guide and the second guide each include a slideable member fixed from movement by a shear pin, and when fixed, each slideable member couples the respective first guide and second guide to the first swing arm and second swing arm, and when released by the shear pin, each slideable member forces the respective first swing arm and second swing arm out of engagement with the respective first guide and the second guide.

20. The system of claim 19, wherein the contact between the compressible member and the stop shears the shear pin in both the first guide and the second guide to release the slideable member so that each slideable member releases the first swing arm and second swing arm substantially simultaneously.

* * * * *